US010615972B2

(12) United States Patent
Zheng et al.

(10) Patent No.: US 10,615,972 B2
(45) Date of Patent: Apr. 7, 2020

(54) SYSTEM AND METHODS OF MANAGING SHARED KEYS IN A COMPUTER CLUSTER WITH HIGH AVAILABILITY

(71) Applicant: VMware, Inc., Palo Alto, CA (US)

(72) Inventors: Haoran Zheng, San Jose, CA (US); Wenguang Wang, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 255 days.

(21) Appl. No.: 15/876,052

(22) Filed: Jan. 19, 2018

(65) Prior Publication Data

US 2019/0229902 A1 Jul. 25, 2019

(51) Int. Cl.
*H04L 9/08* (2006.01)
*H04L 9/06* (2006.01)
*H04L 9/32* (2006.01)

(52) U.S. Cl.
CPC .......... *H04L 9/0833* (2013.01); *H04L 9/0643* (2013.01); *H04L 9/0822* (2013.01); *H04L 9/0861* (2013.01); *H04L 9/0894* (2013.01); *H04L 9/3239* (2013.01)

(58) Field of Classification Search
CPC .................................................. H04L 9/0833
See application file for complete search history.

(56) References Cited

U.S. PATENT DOCUMENTS

| 4,941,176 A    * | 7/1990 | Matyas    | G06F 9/30018 |
|                  |        |           | 380/277      |
| 2004/0153642 A1* | 8/2004 | Plotkin   | G06F 21/85   |
|                  |        |           | 713/150      |
| 2010/0211787 A1* | 8/2010 | Bukshpun  | H04L 9/0838  |
|                  |        |           | 713/170      |
| 2019/0068370 A1* | 2/2019 | Neerumalla| H04L 9/0897  |

* cited by examiner

*Primary Examiner* — William S Powers
(74) *Attorney, Agent, or Firm* — Loza & Loza, LLP

(57) ABSTRACT

A computer and method for managing a shared key in a cluster of computers utilizes a node key to decrypt an encrypted shared key to obtain the shared key. A computer in the cluster can receive the node key from another computer in the cluster by transmitting an encrypted node key that has been encrypted using a master key to the other computer in the cluster, which is then decrypted using the master key at the other computer. The received node key can then be used by the requesting computer to decrypt the encrypted shared key to obtain the shared key.

20 Claims, 14 Drawing Sheets

SYSTEM AND METHODS OF MANAGING SHARED KEYS IN A COMPUTER CLUSTER WITH HIGH AVAILABILITY

BACKGROUND

In a cluster-based data service, a shared cryptographic key is very useful in that data encrypted by one node in the cluster can always be decrypted by other nodes in the same cluster. In order to ensure the shared key's confidentiality, a general practice is to use a master cryptographic key to wrap or encrypt the shared key so that the shared key is only persisted in wrapped or encrypted form. The master key is usually stored and managed by a key management system (KMS), which is an industry standard solution.

When the shared key is needed, each node can retrieve the master key from the KMS and use the master key to decrypt the wrapped shared key. Once the shared key is extracted, the extracted shared key can only be kept in memory for security considerations, and thus, cannot be in persisted form.

Due to this limitation, when a node in the cluster reboots, the shared key in memory is no longer available. Thus, the node has to connect to the KMS to get master key to decrypt the wrapped shared key, which is stored in persisted form. Unfortunately, if the KMS is not available at that time, the node will have no way to decrypt the wrapped shared key to retrieve the shared key.

One solution to continue to operate a cluster with rebooting nodes and an unavailable KMS would be to request the master key from other nodes in the cluster. However, there would have to be an authentication mechanism for the other nodes to know whether the requesting node belongs to the cluster. Such authentication mechanism would be sophisticated to implement, and may add significant complexity to the system.

BRIEF DESCRIPTION OF THE DRAWINGS

Throughout the description, similar reference numbers may be used to identify similar elements.

DETAILED DESCRIPTION

Figure 1:
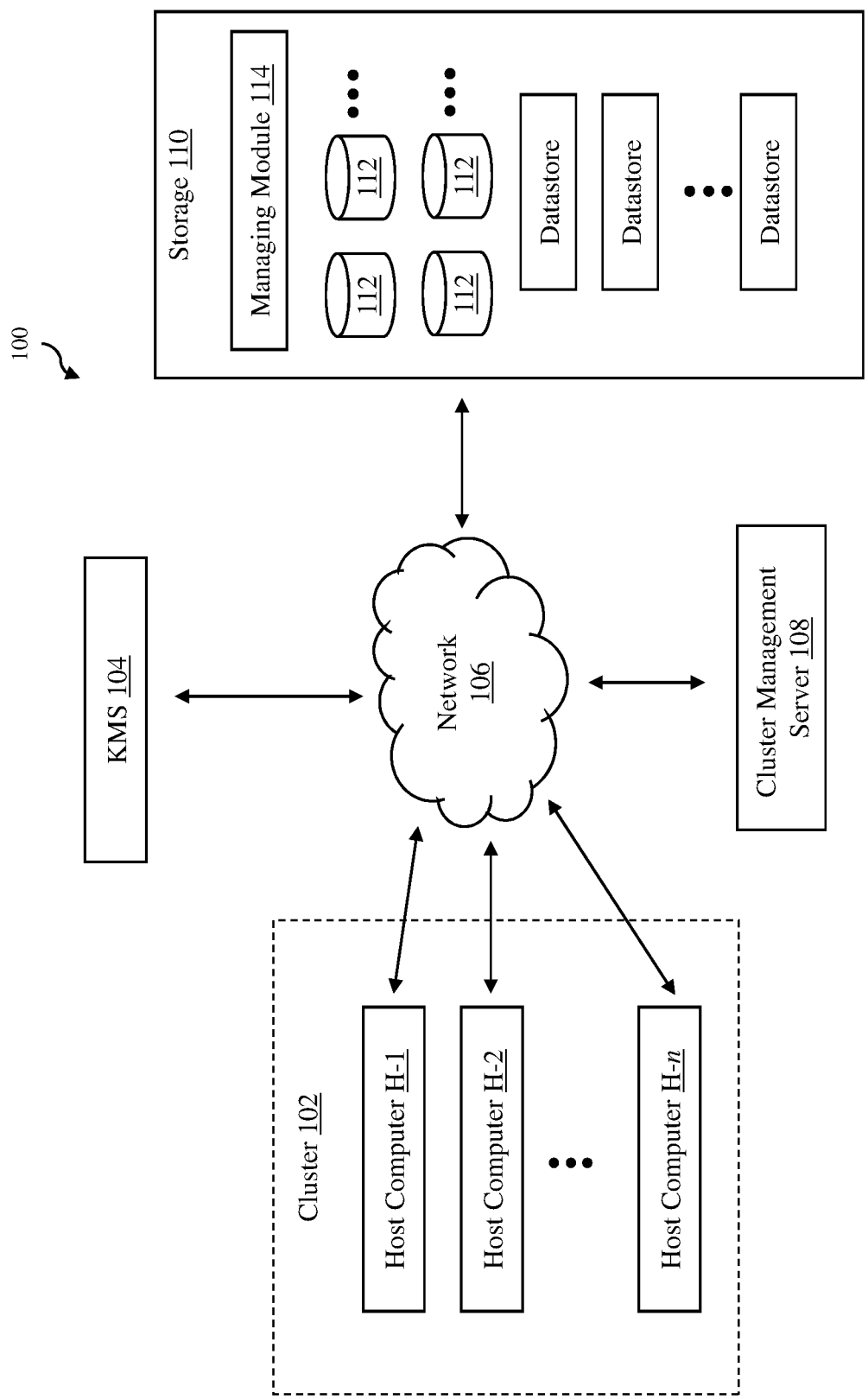
FIG. 1 is a block diagram of a distributed computer system in accordance with an embodiment of the invention.

FIG. 1 shows a distributed computer system 100 in which embodiments of the invention may be implemented. The distributed computer system includes a cluster 102 of host computers H-1, H-2 . . . H-n (n is an integer) that can communicate with a key management system (KMS) 104 via a network 106. As explained in detail below, embodiments of the invention facilitate secure replication of shared cryptographic keys highly available in the cluster without authentication, which eliminates undue reliance on the KMS when the shared cryptographic key is needed by one of the host computers in the cluster.

As illustrated in FIG. 1, the distributed computer system 100 further includes a cluster management server 108 and storage 110, in addition to the cluster 102 of host computers H-1, H-2 . . . H-n, the KMS 104 and the network 106. The host computers H-1, H-2 . . . H-n, the KMS 104, the cluster management server 108 and the storage 110 are all connected to the network 106. Thus, these components of the distributed computer system 100 are able to communicate with each other and/or share resources, such as storage space provided by the storage, via the network.

In an embodiment, the host computers H-1, H-2 . . . H-n are physical computer systems that host or support one or more virtual entities so that the virtual entities are executing on the physical computer systems. As used herein, the term "virtual entity" is any software entity that can run on a computer system, such as a software application, a software process, a virtual machine (VM) or a "container" that provides system-level process isolation or operating system level virtualization such as Docker™. The host computers may be servers that are commonly found in datacenters. As an example, the host computers may be servers installed in a single server rack. However, in other embodiments, the host computers may be installed in multiple server racks in the same or different facilities. Still, in other embodiments, the host computers may be software processes running on multiple physical computer systems. The host computers may be referred to herein as nodes.

Figure 2:
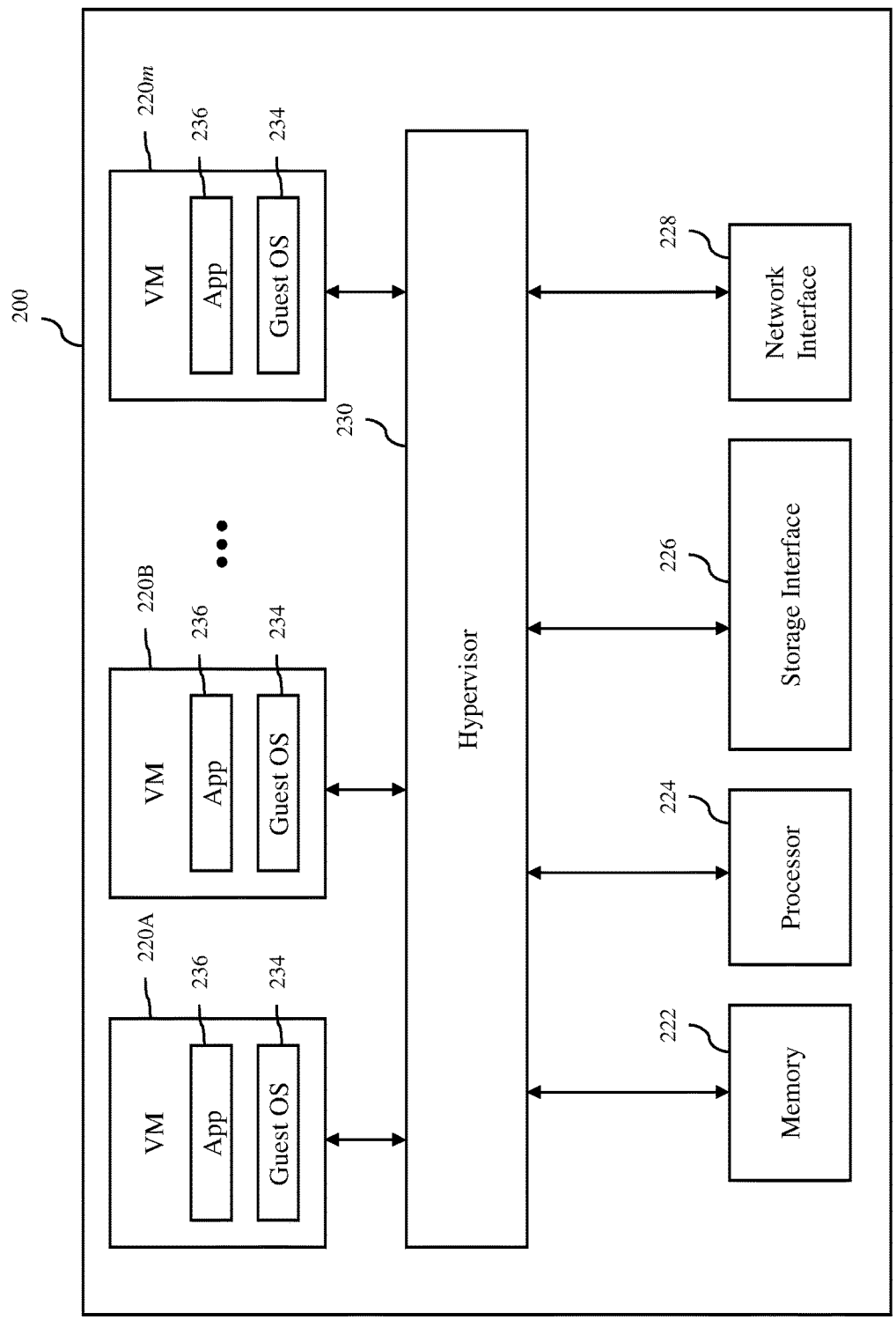
FIG. 2 is a block diagram of a host computer in accordance with an embodiment of the invention.

Turning now to FIG. 2, components of a host computer 200 that is representative of the host computers H-1, H-2 . . . H-n in accordance with an embodiment of the invention are shown. In FIG. 2, the physical connections between the various components of the host computer are not illustrated. In the illustrated embodiment, the host computer is configured to support a number of virtual entities 220A, 220B . . . 220m (m is an integer), which are VMs. The number of VMs supported by the host computer can be anywhere from one to more than one hundred. The exact number of VMs supported by the host computer is only limited by the physical resources of the host computer and the resource requirements of the VMs. The VMs share at least some of the hardware resources of the host computer, which include one or more system memories 222, one or more processors 224, one or more storage interfaces 226, and one or more network interfaces 228. Each system memory 222, which may be random access memory (RAM), is the volatile memory of the host computer. Each processor 224 can be any type of a processor, such as a central processing unit (CPU) commonly found in a server. In some embodiments, each processor may be a multi-core processor, and thus, includes multiple independent processing units or cores. The storage interface 226 is an interface that allows that host computer to communicate with the storage 110. As an example, the storage interface may be a host bus adapter or a network file system interface. The network interface 228 is an interface that allows the host computer to communicate with other devices connected to the network 106. As an example, the network interface may be a network adapter.

In the illustrated embodiment, the VMs 220A, 220B . . . 220m run on "top" of a hypervisor 230, which is a software interface layer that, using virtualization technology, enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for guest software. Each VM may include a guest operating system 234 and one or more guest applications 236. The guest operating system manages virtual system resources made available to the corresponding VM by the hypervisor, and, among other things, the guest operating system forms a software platform on top of which the guest applications run.

Similar to any other computer system connected to the network 106, the VMs 220A, 220B . . . 220m are able to communicate with other computer systems connected to the network using the network interface 228 of the host computer 200. In addition, the VMs are able to access the storage 110 using the storage interface 226 of the host computer.

Turing back to FIG. 1, the network 106 can be any type of computer network or a combination of networks that allows communications between devices connected to the network. The network 106 may include the Internet, a wide area network (WAN), a local area network (LAN), a storage area network (SAN), a fiber channel network and/or other networks. The network 106 may be configured to support protocols suited for communications with storage arrays, such as Fiber Channel, Internet Small Computer System Interface (iSCSI), Fiber Channel over Ethernet (FCoE) and HyperSCSI.

The storage 110 is used to store data for the host computers H-1, H-2 . . . H-n, which can be accessed like any other storage device connected to computer systems. In an embodiment, the storage can be accessed by entities, such as clients running on the host computers, using any file system, e.g., virtual machine file system (VMFS) or network file system (NFS). The storage includes one or more computer data storage devices 112, which can be any type of storage devices that are commonly used for data storage. As an example, the data storage devices 112 may be, but not limited to, persistent memory (PM), non-volatile memory express (NVMe), solid-state devices (SSDs), hard disks or a combination of the four. At least some of these storage devices may be local storage devices of the host computers, e.g., locally attached disks or SSDs within the host computers. The storage devices may operate as components of a network-attached storage (NAS) and/or a storage area network (SAN), or may support a virtual SAN. The storage includes a storage managing module 114, which manages the operation of the storage. In an embodiment, the storage managing module is a computer program executing on one or more computer systems (not shown) of the storage.

As illustrated in FIG. 1, the storage 110 may support multiple datastores, which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers H-1, H-2 . . . H-n. For virtual machines, the datastores may be used to store virtual storage, e.g., virtual disks, used by each of the virtual machines, as well as other files needed to support the virtual machines. One or more datastores may be associated with one or more clusters of host computers. The same datastore may be associated with more than one cluster of host computers.

The cluster management server 108 operates to monitor and manage the host computers H-1, H-2 . . . H-n in the cluster 102. The cluster management server may be configured to monitor the current configurations of the host computers and the virtual entities running on the host computers, for example, virtual machines (VMs). The monitored configurations may include hardware configuration of each of the host computers and software configurations of each of the host computers. The monitored configurations may also include virtual entity hosting information, i.e., which virtual entities (e.g., VMs) are hosted or running on which host computers. The monitored configurations may also include information regarding the virtual entities running on the different host computers.

The cluster management server 108 may also perform operations to manage the virtual entities and the host computers H-1, H-2 . . . H-n in the cluster 102. In an embodiment, the cluster management server may include a resource management module, which can be enabled by a user, to perform various resource management operations for the cluster, including virtual entity placement operations for either initial placement of virtual entities and/or load balancing. The process for initial placement of virtual entities, such as VMs, may involve selecting suitable host computers for placement of the virtual entities based on memory and CPU requirements of the virtual entities, the current memory and CPU load on all the host computers in the cluster and the memory and CPU capacity of all the host computers in the cluster.

The cluster management server 108 may also manage shared cryptographic keys used in the cluster 102. In particular, the cluster management server may interface with the KMS 104 to obtain one or more new master cryptographic keys from the KMS, which can be used to wrap or encrypt one or more shared keys that can be used in the cluster by the host computers H-1, H-2 . . . H-n and/or virtual entities running on the host computers. The cluster management server may use any cryptographic algorithm to encrypt the shared keys using the master keys, such as Data Encryption Standard (DES), triple DES, Advanced Encryption Standard (AES), Rivest, Shamir, and Adleman (RSA) and elliptic curve cryptography (ECC). The wrapped or encrypted shared keys are then distributed to the host computers in the cluster during an initial setup operation so that the shared keys can be used at the host computers. In an embodiment, rather than transmitting the master key to the host computers in the cluster, each encrypted shared key is transmitted with an identification (ID) of the corresponding master key so that the host computers can obtain the master key from the KMS using the master key ID when needed. For any new host computer to be added to the cluster after the initial setup, the cluster management server may add the new host computer into the cluster and help the new host computer to set up shared keys.

In some embodiments, the cluster management server 108 may be a physical computer. In other embodiments, the cluster management server may be implemented as one or more software programs running on one or more physical computers, such as the host computer 200 shown in FIG. 2, or virtual computers, such as the VMs 220A, 220B . . . 220m. In an implementation, the cluster management server is a VMware vCenter™ server with at least some of the features available for such a server.

The KMS 104 operates to manage master keys used by the host computers H-1, H-2 . . . H-n in the cluster 102. The KMS can create new master keys and generate IDs of the master keys so that the master keys can be found using the master key IDs. The KMS may have security features to ensure the security of the master keys. The KMS may be a service provided by a third party with respect to the cluster of host computers. That is, the cluster of host computers may be operated or managed by one business entity, while the KMS is operated or managed by another business entity.

In some embodiments, the KMS 104 may be implemented as one or more software programs running on one or more physical or virtual computers. In an implementation, the KMS may be a web-based service provided by a third-party entity.

Figure 3:
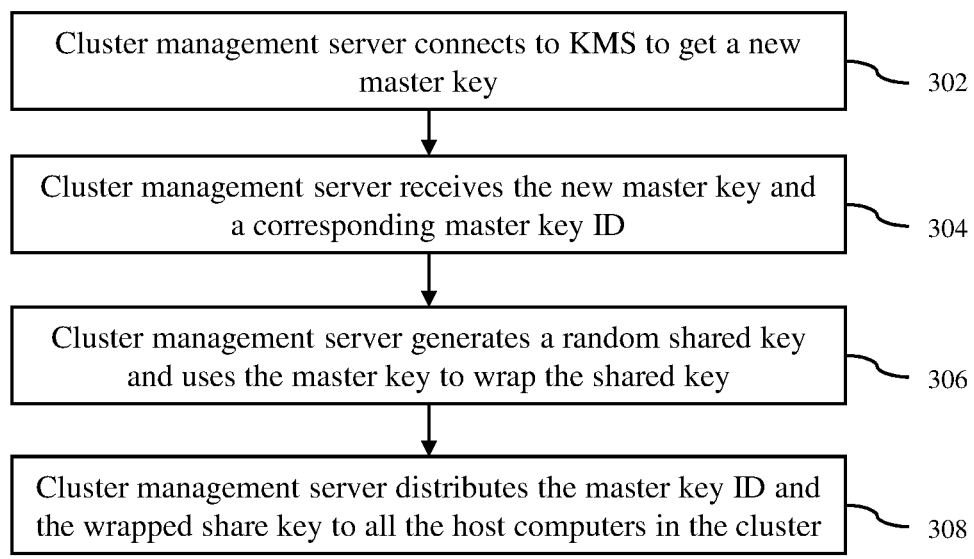
FIG. 3 is a process flow diagram of an initial setup operation performed by a cluster management server of the distributed computer system with respect to a shared key in accordance with an embodiment of the invention.
Figure 4:
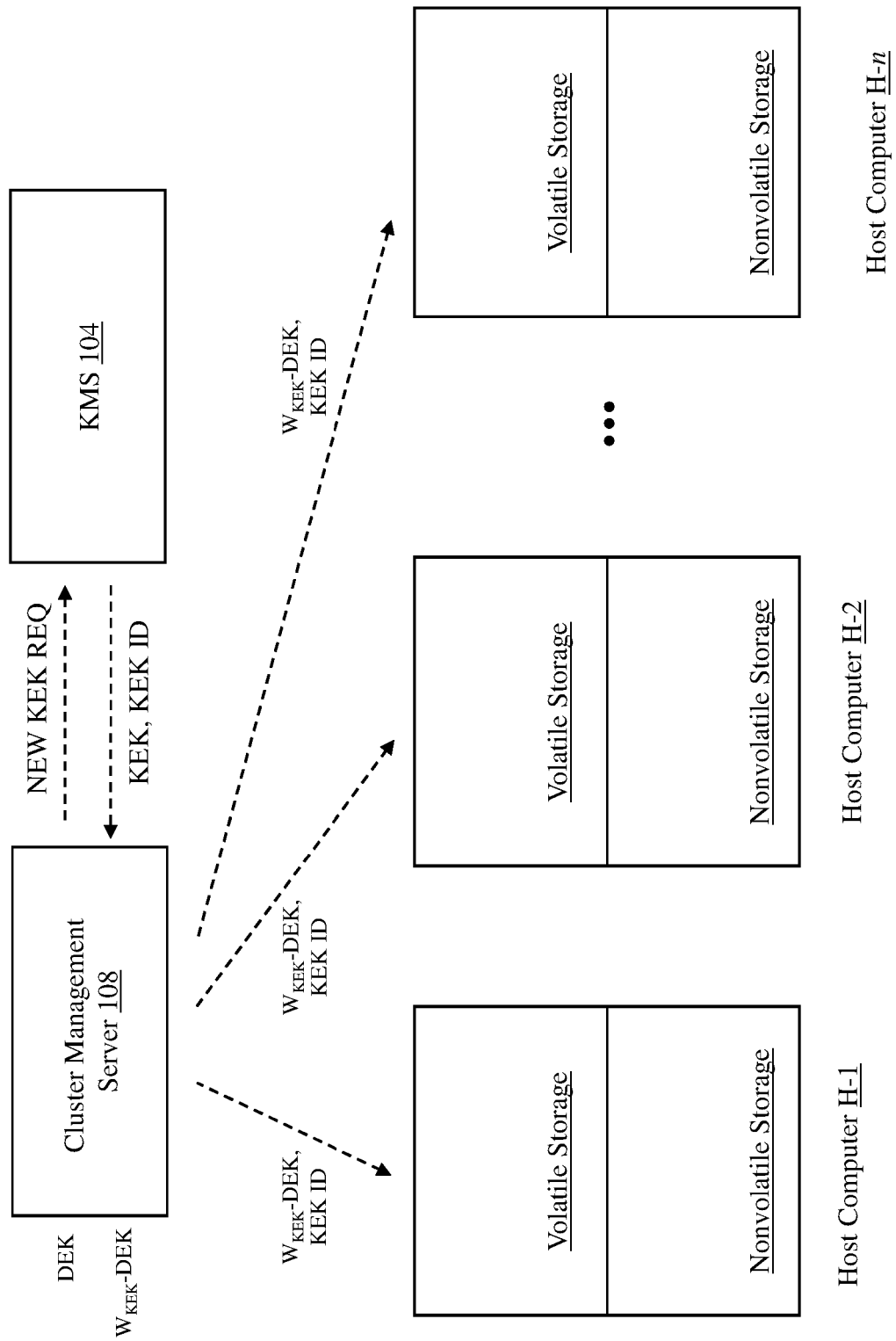
FIG. 4 illustrates the initial setup operation shown in the process flow diagram of FIG. 3.

An initial setup operation performed by the cluster management server 108 of the distributed computer system 100 with respect to a shared cryptographic key in accordance with an embodiment of the invention is described with reference to a process flow diagram of FIG. 3. At block 302, the cluster management server 108 connects to the KMS 104 to get a new master key. This step may involve transmitting a request message for a new master key (also known as key encryption key (KEK)) from the cluster management server 108 to the KMS 104. In response, the KMS sends the new master key with a corresponding master key identification (ID). This step is illustrated in FIG. 4, which shows a new master key request message, NEW KEK REQ, being sent from the cluster management server 108 to the KMS 104.

Next, at block 304, the cluster management server 108 receives the new master key and the corresponding master key ID. This step is also illustrated in FIG. 4, which shows a new master key, KEK, and its ID, KEK ID, being sent from the KMS 104 to the cluster management server 108.

Next, at block 306, the cluster management server 108 generates a random shared cryptographic key (also known as data encryption key (DEK)) and uses the master key to wrap or encrypt the shared key using a cryptographic algorithm, such as AES. This step is also illustrated in FIG. 4, which shows a shared key, DEK, being generated and wrapped using the master key, KEK, to produce a wrapped or encrypted shared key, $W_{KEK}$-DEK, at the cluster management server 108.

Next, at block 308, the cluster management server 108 distributes the master key ID and the wrapped share key to all the host computers H-1, H-2 . . . H-n in the cluster 102. In an embodiment, the distribution of the master key ID and the wrapped share key to all the host computers H-1, H-2 . . . H-n in the cluster 102 may be done using secured and authenticated channels. This step is also illustrated in FIG. 4, which shows the master key ID, KEK ID, and the wrapped shared key, $W_{KEK}$-DEK, being transmitted to each of the host computers H-1, H-2 . . . H-n in the cluster 102.

Figure 5:
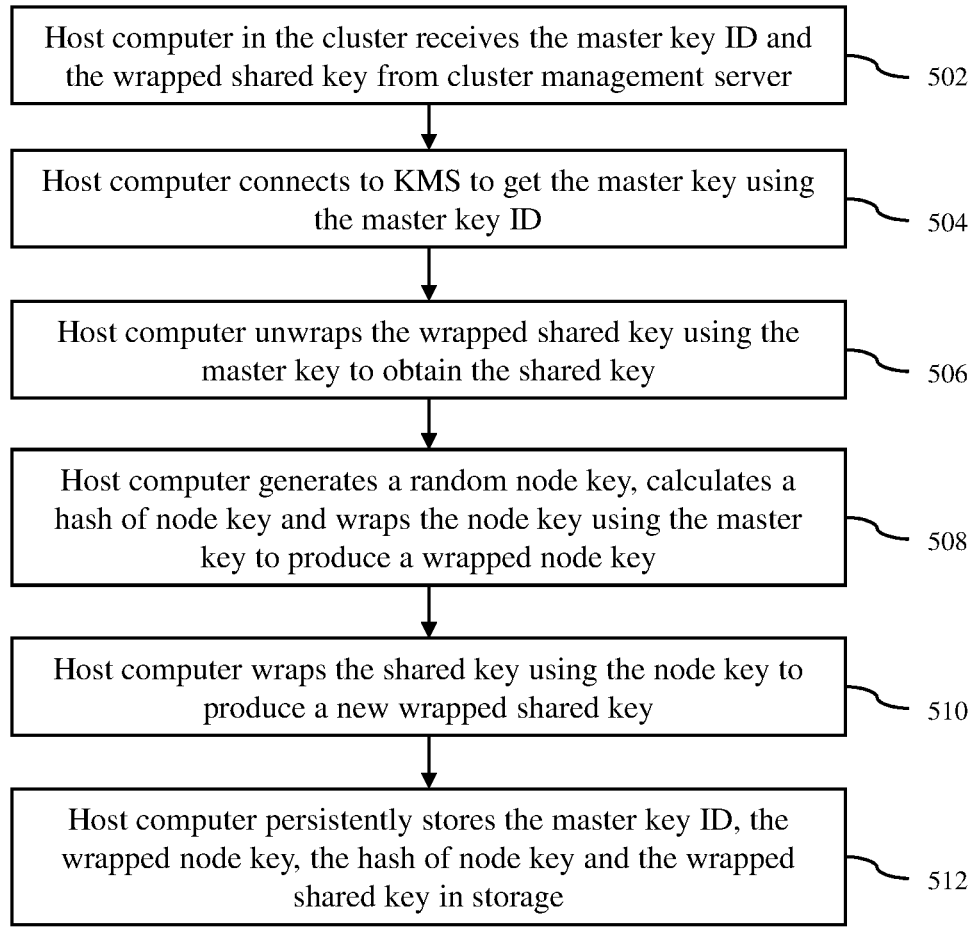
FIG. 5 is a process flow diagram of an initial setup operation performed by each of the host computers in the cluster of the distributed computer system with respect to a shared key in accordance with an embodiment of the invention.
Figure 6:
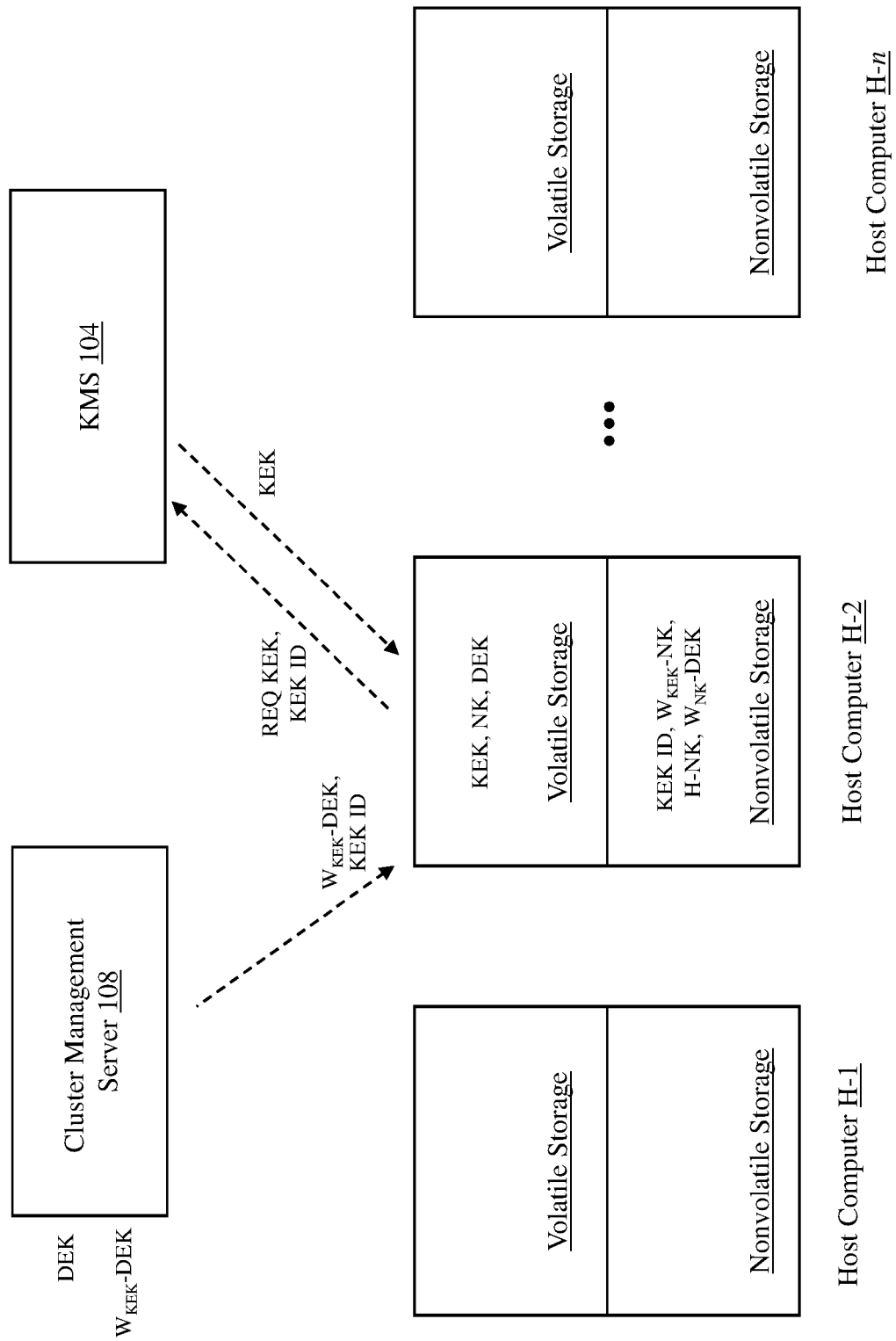
FIG. 6 illustrates the initial setup operation shown in the process flow diagram of FIG. 5.

An initial setup operation performed by each of the host computers H-1, H-2 . . . H-n in the cluster 102 of the distributed computer system 100 with respect to a shared key in accordance with an embodiment of the invention is described with reference to a process flow diagram of FIG. 5. At block 502, a host computer in the cluster 102 receives the master key ID and the wrapped shared key from the cluster management server 108. This step is illustrated in FIG. 6, which shows the wrapped shared key, $W_{KEK}$-DEK, and the master key ID, KEK ID, being received at the host computer H-2 in the cluster 102.

Next, at block 504, the host computer connects to the KMS 104 to get the master key using the master key ID. In one implementation, the host computer requests the master key from the KMS by sending a request message with the master key ID. In response, the KMS locates the master key corresponding to the master key ID and sends the master key back to the requesting host computer. This step is illustrated in FIG. 6, which shows a request message for the master key, REQ KEK, with the master key ID, KEK ID, being transmitted from the host computer H-2 to the KMS 104. In addition, FIG. 6 shows the master key, KEK, that corresponds to the master key ID, KEK ID, being transmitted from the KMS 104 back to the host computer H-2.

Next, at block 506, the host computer unwraps or decrypts the wrapped shared key using the master key to obtain the shared key. This step is also illustrated in FIG. 6, which shows the shared key, DEK, in the volatile storage, e.g., RAM, of the host computer H-2, which was obtained by unwrapping the wrapped shared key, $W_{KEK}$-DEK, using the master key, KEK.

Next, at block 508, the host computer generates a random cryptographic node key, calculates the hash of the node key and wraps or encrypts the node key using the master key to produce a wrapped or encrypted node key. This step is also illustrated in FIG. 6, which shows a random node key, NK, in the volatile storage of the host computer H-2, and the hash of the node key, H-NK, in the nonvolatile storage of the host computer H-2. In addition, FIG. 6 shows a wrapped NK, $W_{KEK}$-NK, which was wrapped or encrypted using the master key, KEK, in the nonvolatile storage of the host computer H-2.

Next, at block 510, the host computer wraps or encrypts the shared key using the node key to produce a new encrypted or wrapped shared key. This step is also illustrated in FIG. 6, which shows a new wrapped shared key, $W_{NK}$-DEK, at the host computer H-2, which was wrapped or encrypted using the node key, NK.

Next, at block 512, the host computer persistently stores the master key ID, the wrapped node key, the hash of node key and the wrapped shared key in a storage accessible by the host computer, e.g., the storage. This step is also illustrated in FIG. 6, which shows the master key ID, KEK ID, the wrapped node key, $W_{KEK}$-NK, the hash of node key, H-NK, and the wrapped shared key, $W_{NK}$-DEK, being stored in the nonvolatile storage of the host computer H-2, which may be hard disk at the host computer H-2 or part of the storage 110 accessible by the host computer H-2.

Once all the host computers H-1, H-2 . . . H-n in the cluster 102 obtain the shared key using the master key ID and the wrapped shared key from the cluster management server 108 and the master key from the KMS 104, the host computers can use the shared key to encrypt and decrypt data that is used in the cluster. Once this initial setup operation has completed, the cluster management server 108 can fail at any time without affecting the workload performed in the cluster using the shared key. As explained below, any host computer in the cluster 102 can replicate the shared key by getting the master key from the KMS or its node key from a peer host computer in the cluster. Thus, the shared key is highly available to the host computers in the cluster 102, which improves the performance of the host computers with respect to being able to perform workload using the shared key even when the cluster management server 108 and/or the KMS 104 are not available.

Figure 7:
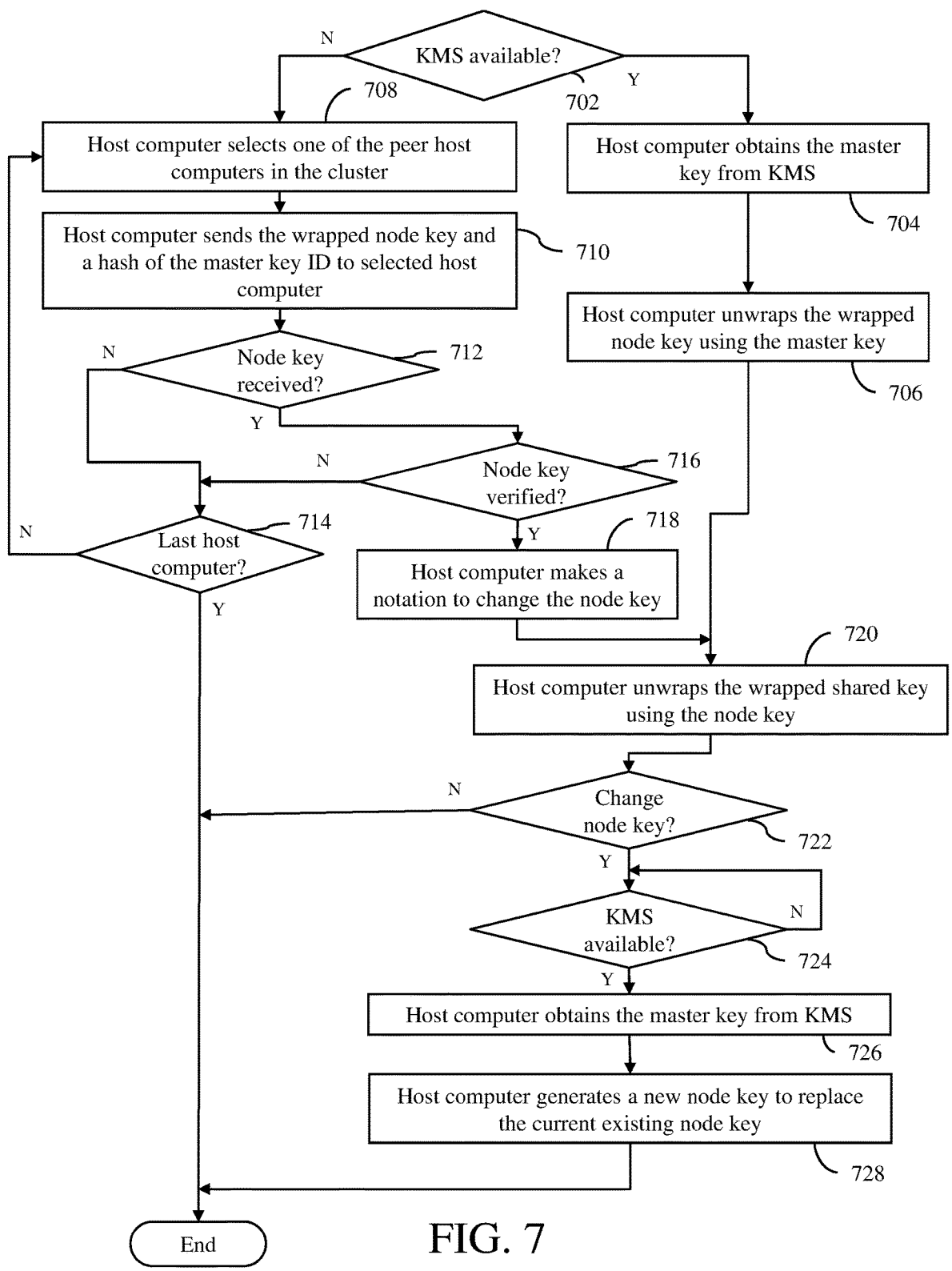
FIG. 7 is a process flow diagram of a bootstrap operation of a host computer in the cluster of the distributed computer system with respect to a shared key in accordance with an embodiment of the invention.

A bootstrap operation of a host computer in the distributed computer system 100 with respect to a shared key in accordance with an embodiment of the invention is described with reference to a process flow diagram of FIG. 7. The bootstrap operation is performed when the host computer is rebooted.

Figure 8A:
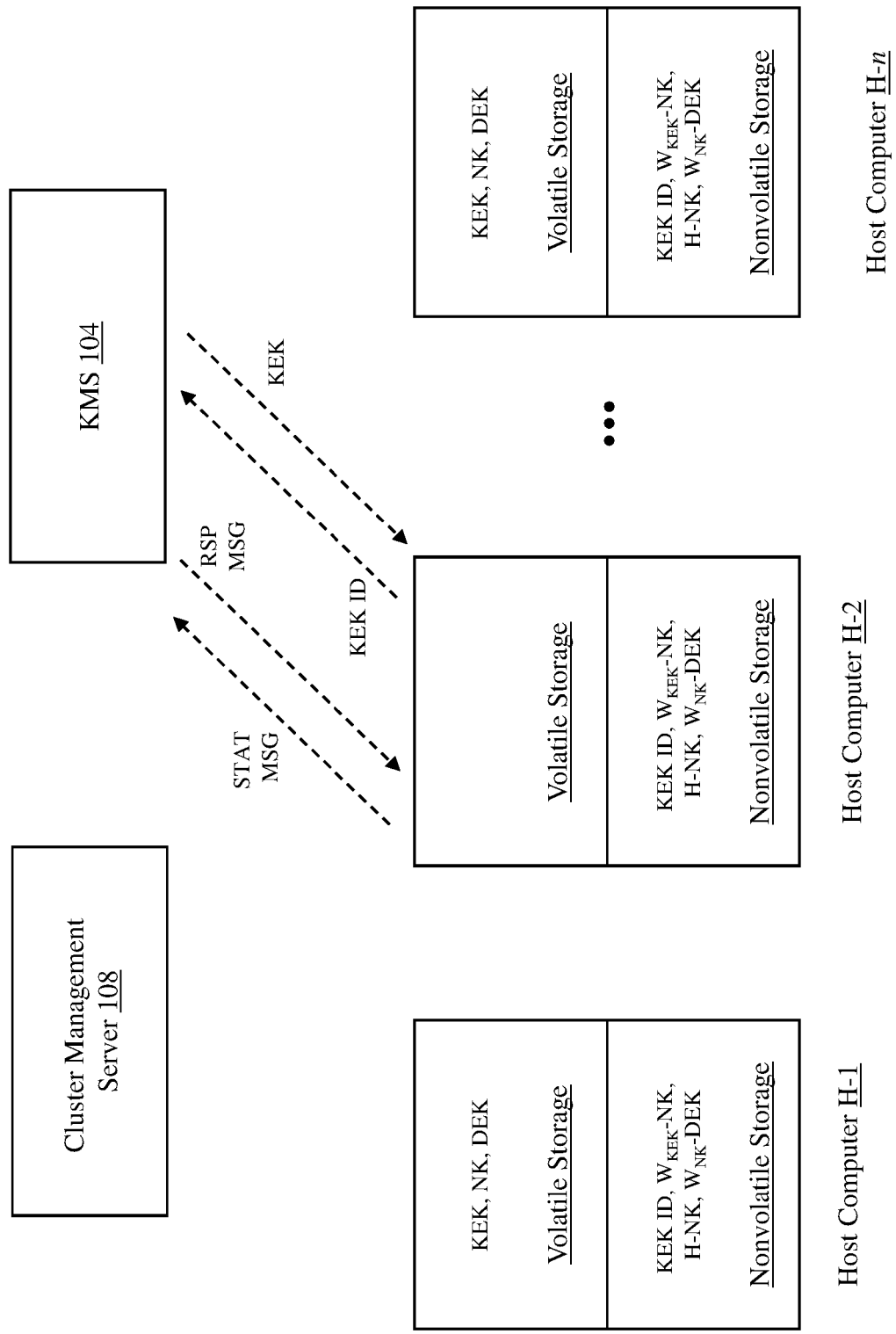
FIGS. 8A-8F illustrate the bootstrap operation shown in the process flow diagram of FIG. 7.

At block 702, a host computer being rebooted determines whether the KMS 104 is available. In some implementations, this determination is made by transmitting a status message from the host computer to the KMS and waiting for a response message from the KMS. If a response message is received within a predefined time period, then the KMS is deemed to be available. However, if a response message is not received within the predefined time period, then the KMS is deemed to be unavailable. This step is illustrated in FIG. 8A, which shows a status message, STAT MSG, being transmitted from the host computer H-2 to the KMS 104, and a response message, RSP MSG, being transmitted back to the host computer H-2 from the KMS.

If the KMS 104 is available, the operation proceeds to block 704, where the host computer obtains the master key from the KMS to access the shared key. In some implementations, the master key is obtained by transmitting the ID of the master key from the host computer to the KMS to request the master key and then receiving the master key in response to the transmitted master key ID. In some embodiments, the KMS may hold a number of master keys for the cluster or other clusters of host computers, which can be selectively retrieved using corresponding master key IDs. This step is illustrated in FIG. 8A, which shows the master key ID, KEK ID, being transmitted from the host computer H-2 to the KMS, and the master key, KEK, being transmitted back to the host computer H-2 from the KMS. In FIG. 8A, the volatile storage of the host computer H-2, such as RAM, is empty of the master key (KEK), the node key (NK) and the shared key (DEK) since it has been rebooted. However, the nonvolatile storage of the host computer H-2, which may be an attached hard disk or part of the storage 110 accessible by the host computer H-2, contains the master key ID (KEK ID), the wrapped node key ($W_{KEK}$-NK), the hash of node key (H-NK) and the wrapped shared key ($W_{NK}$-DEK).

In an embodiment, the KMS availability determination may be made by simply sending the master key ID to the KMS 104 and waiting for the master key. If the master key is not received by the requesting host computer within a predefined time period, then the KMS is deemed to be not available.

Figure 8B:
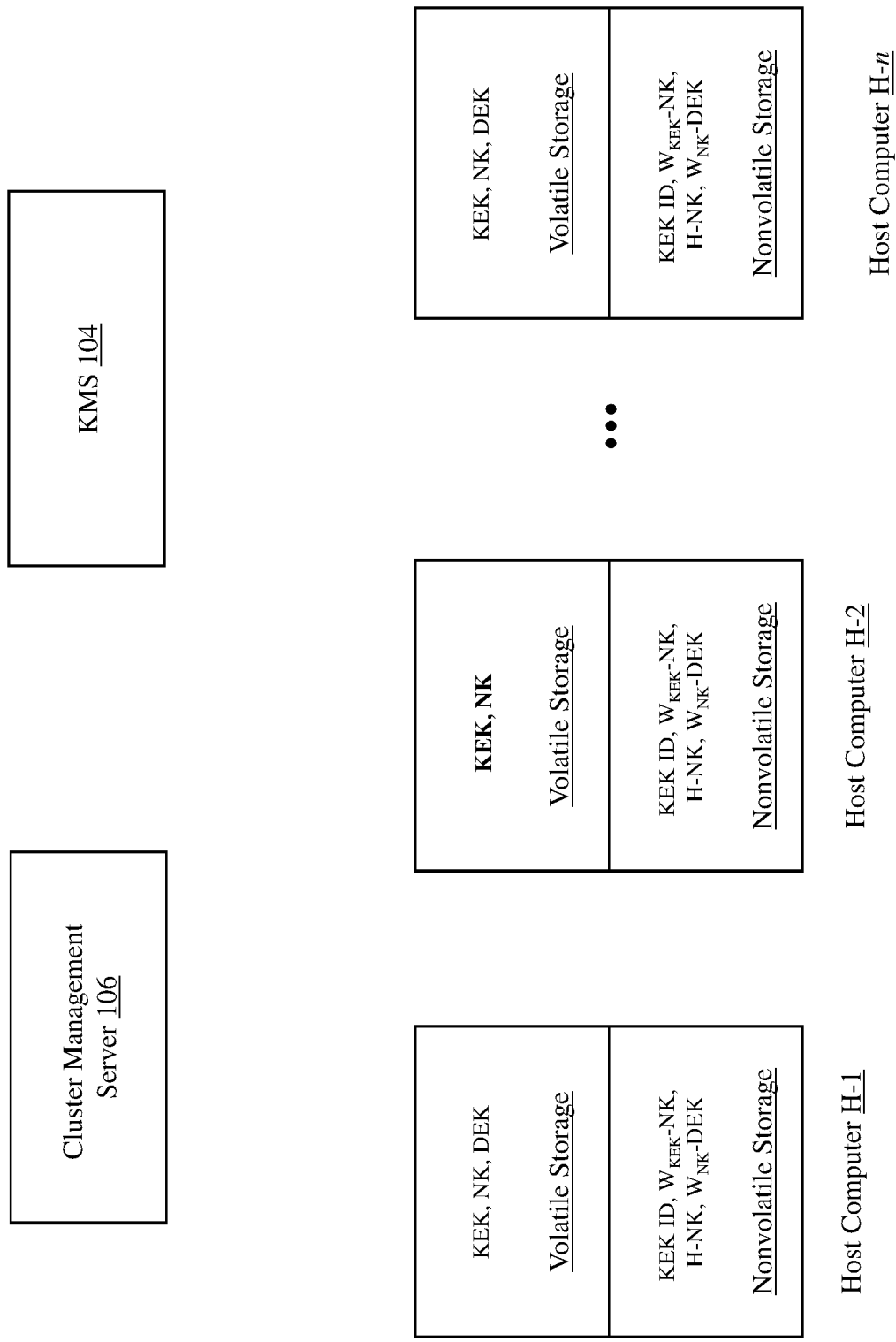

Next, at block 706, the host computer unwraps or decrypts the wrapped node key using the master key received from the KMS 104 to obtain the node key. This step is illustrated in FIG. 8B, which shows the node key, NK, in the volatile storage of the host computer H-2, which was obtained by unwrapping the wrapped node key, $W_{KEK}$-NK, using the master key, KEK.

Figure 8C:
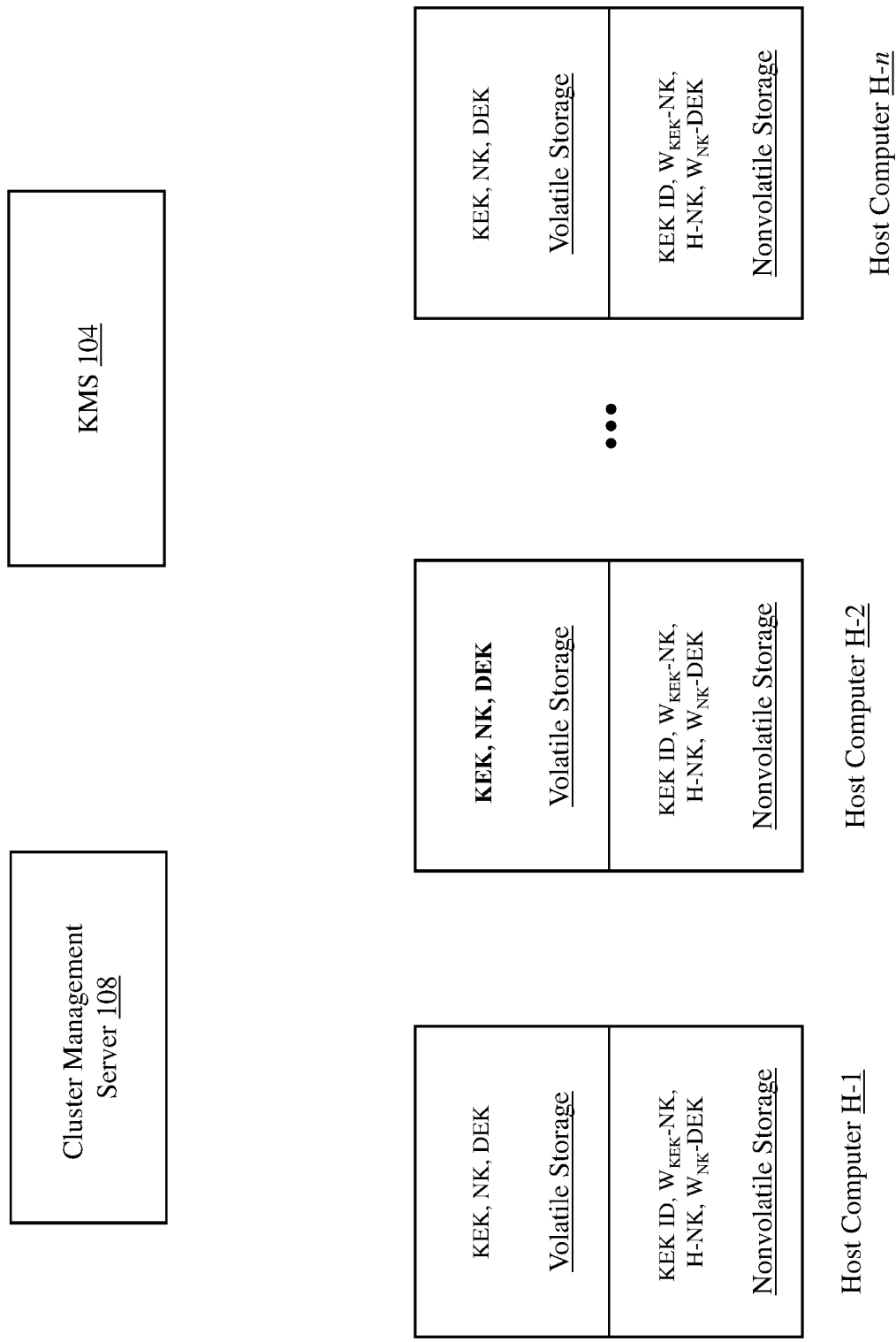

The operation then proceeds to block 720, where the host computer unwraps or decrypts the wrapped shared key using the node key to obtain the shared key. The shared key can now be used to encrypt and decrypt data at the host computer. This step is illustrated in FIG. 8C, which shows the shared key, DEK, in the volatile storage of the host computer H-2, which was obtained by unwrapping the wrapped shared key, $W_{NK}$-DEK, using the node key, NK.

Figure 8D:
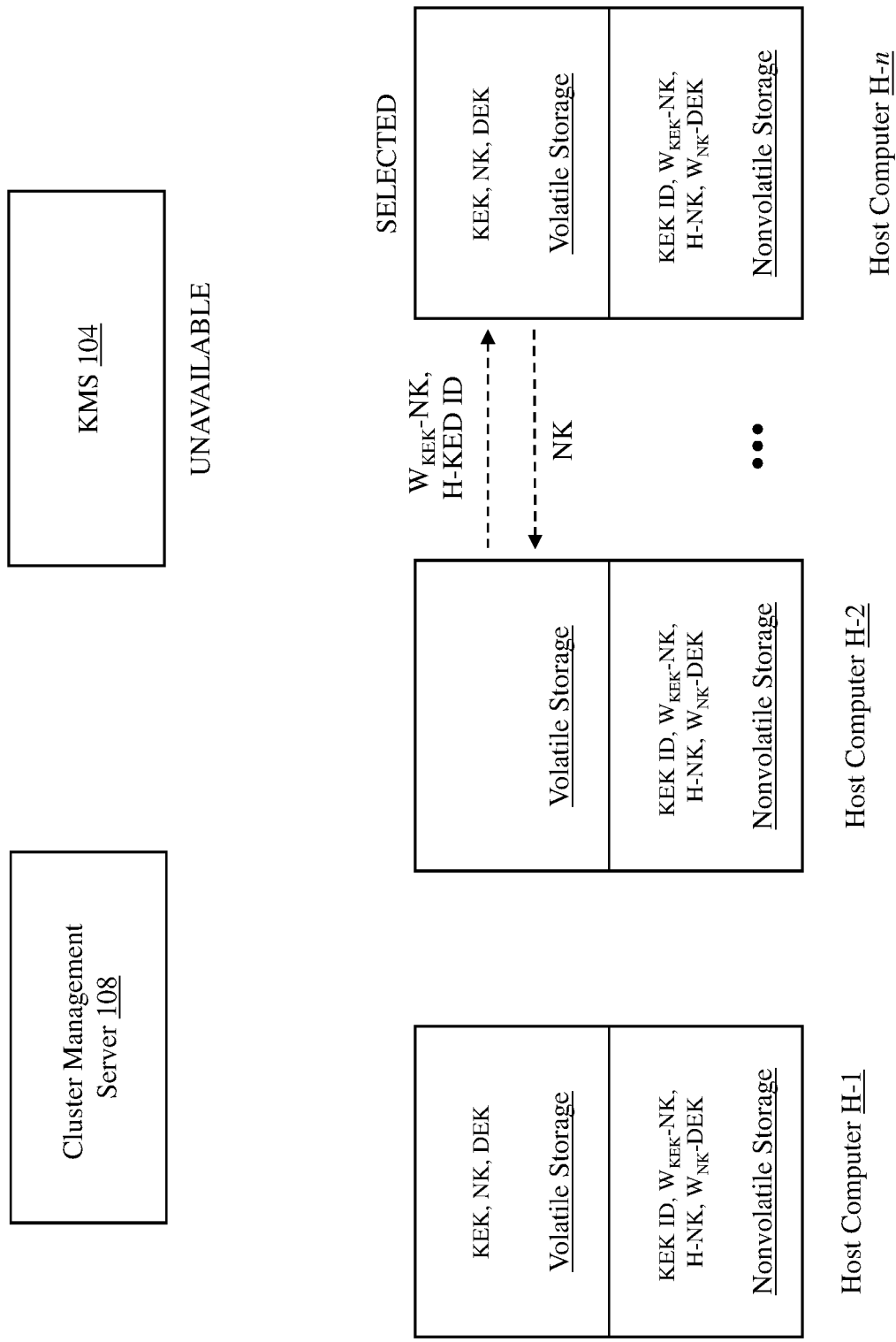

However, if the KMS 104 is determined to be unavailable at block 702, the operation proceeds to block 708, where the host computer selects one of the peer host computers in the cluster 102 to resolve the failure to obtain the master key due to the unavailability of the KMS. The selection of the peer host computer in the cluster may be random or in accordance with a predefined order of host computers in the cluster. This step is illustrated in FIG. 8D, which shows the peer host computer H-n being selected by the host computer H-2.

Next, at block 710, the host computer sends the wrapped node key and a hash of the master key ID to the selected host computer. In response, the selected host computer checks the received hash of the master key ID to find the matching master key. In order to find the matching master key, the selected host computer can calculate the hash of a master key ID corresponding to each master key in its possession. The calculated hash can then be compared to the received hash for comparison to identify the right master key. If the selected host computer has the matching master key, the selected host computer will unwrap or decrypt the received wrapped node key with the master key and send the node key (i.e., unwrapped node key) back to the requesting host computer. This step is illustrated in FIG. 8D, which shows the wrapped node key, $W_{KEK}$-NK, and the hash of the master key ID, H-KEK ID, being transmitted from the host computer H-2 to the selected host computer H-n, which are used to find the master key, KEK, and then unwrap the wrapped node key, $W_{KEK}$-NK, using the master key, KEK. In addition, FIG. 8D shows the node key, NK, being transmitted from the selected host computer H-n to the requesting host computer H-2.

Next, at block 712, the host computer determines whether the node key has been received within a predefined time period. If the node key has not been received, then the operation proceeds to block 714, where the host computer determines whether the selected host computer is the last selectable host computer in the cluster 102. If the selected host computer is the last selectable host computer in the cluster, then the operation comes to an end. In some embodiments, the host computer may then notify the cluster management server 108 of the failure. However, if the selected host computer is not the last selectable host computer in the cluster, then the operation proceeds back to block 708, where another host computer in the cluster is selected by the host computer.

If the node key has been received at block 712, the operation proceeds to block 716, where the host computer verifies that the received node key is the correct node key for the host computer. In an embodiment, the host computer calculates the hash of the received node key and compares the calculated hash of the node key with the persistently stored hash of the node key to determine if there is a match, which indicates that the received node key is the right node key for the host computer.

If the received node key is not verified, the operation proceeds to block 714 to see if another host computer in the cluster can be selected to retrieve the correct node key for the host computer. If the received node key is verified, the operation proceeds to block 718, where the host computer makes a notation to change the node key and rewrap or encrypt the shared key using a new node key. The notation may be implemented as a flag stored in persistent storage that can be accessed by the host computer, e.g., the storage 110.

Figure 8E:
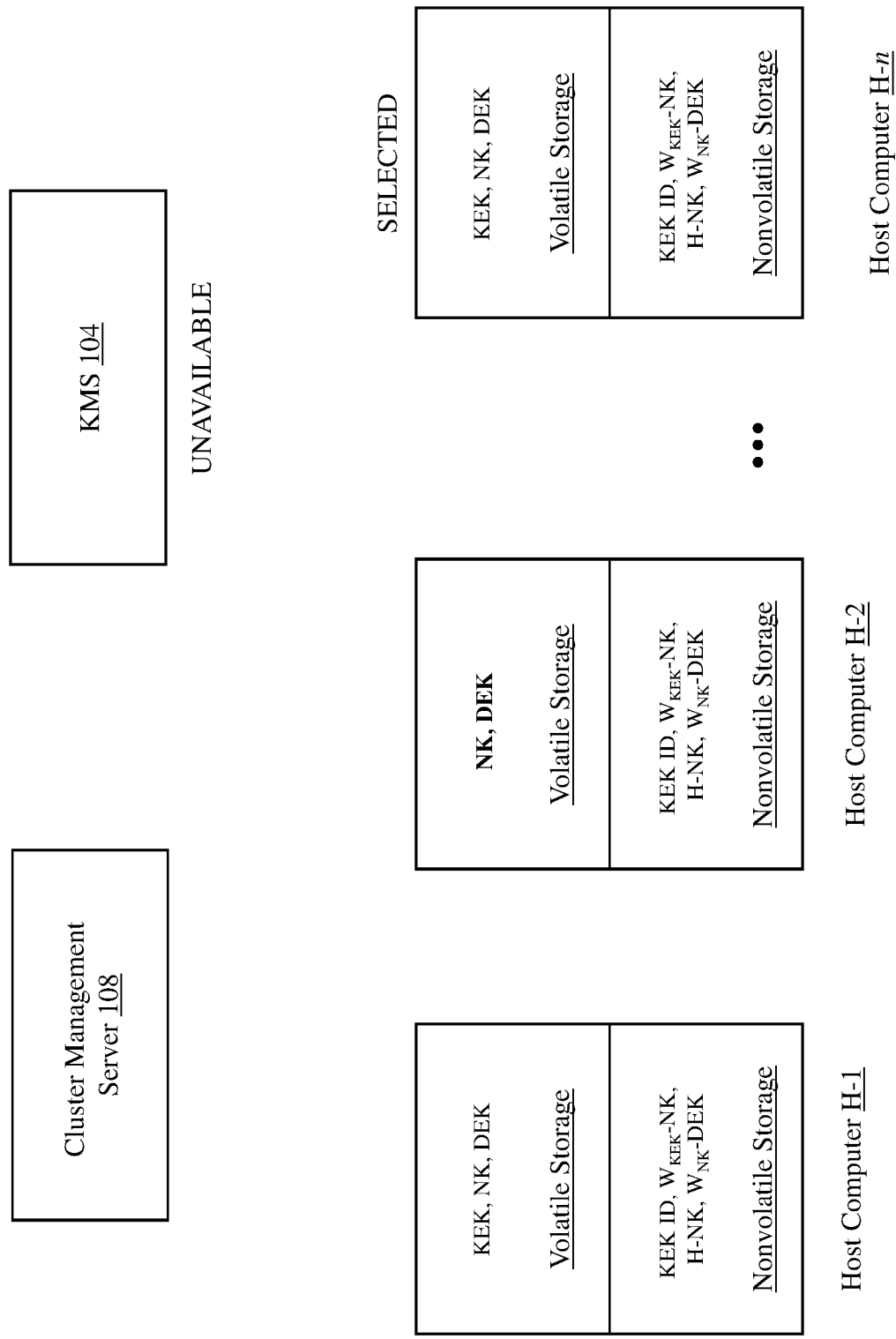

The operation then proceeds to block 720, where the host computer unwraps or decrypts the wrapped shared key, which is persistently stored, using the node key. The shared key can now be used by the host computer to encrypt and decrypt data as needed. This step is illustrated in FIG. 8E, which shows the shared key, DEK, in the volatile storage of the host computer H-2, which was obtained by unwrapping the wrapped shared key, $W_{NK}$-DEK, using the node key, NK, from the peer host computer H-n.

At block 722, the host computer determines whether the current node key should be changed. This determination can be made by checking for the notation to change the node key, e.g., checking for the stored flag. If the current node key does not need to be changed, the operation comes to an end. However, if the current node key does need to be changed, the operation proceeds to block 724.

At block 724, the host computer checks to see if the KMS 104 is now available. If the KMS is still not available, the host computer will check again at a later time, which may be after a set waiting period. If the KMS is available, the operation proceeds to block 726, where the host computer obtains the master key from the KMS.

Figure 8F:
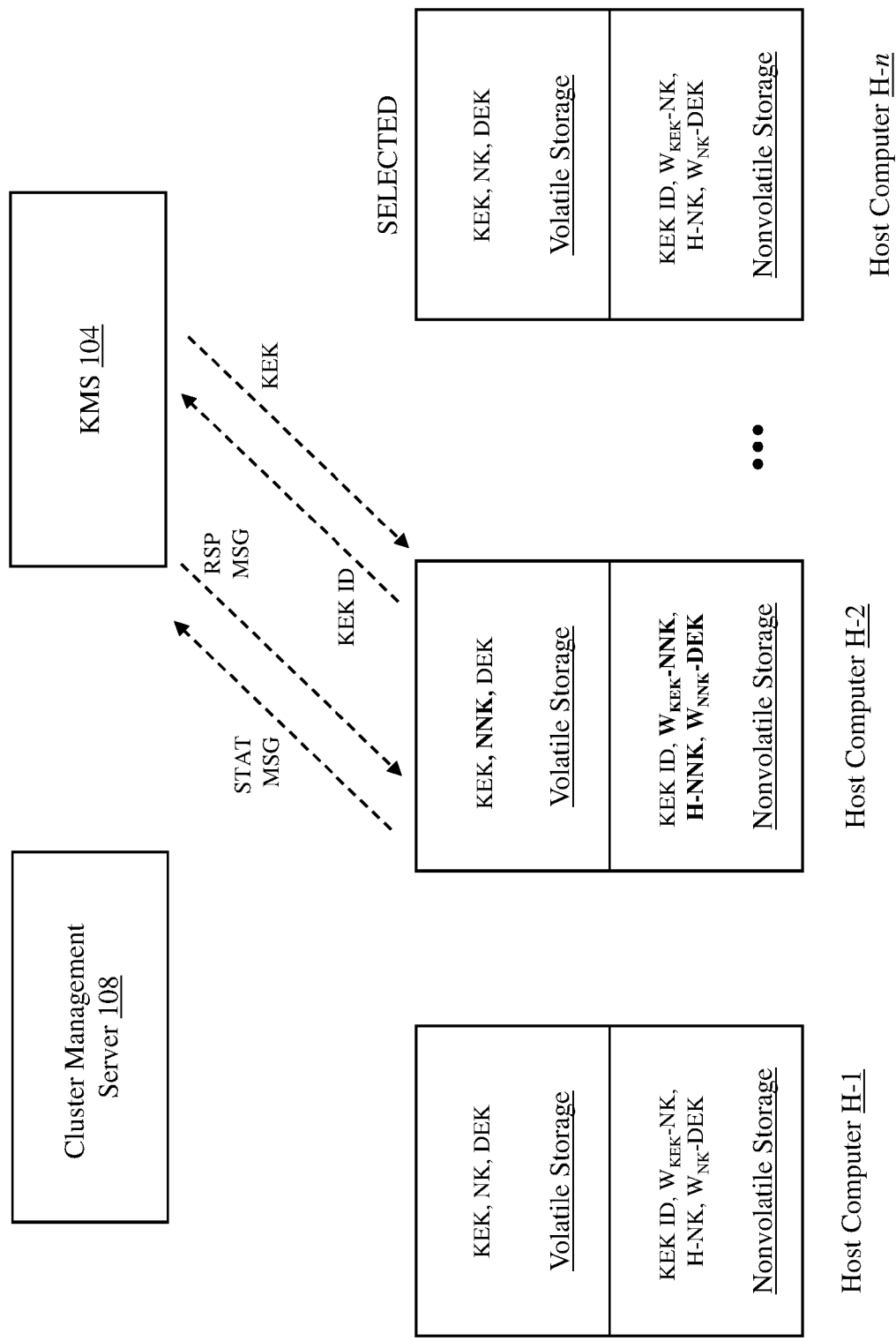

Next, at block 728, the host computer generates a new node key to replace the current existing node key. In addition, the host computer rewraps or encrypts the shared key using the new node key, rewraps the new node key using the master, calculates the hash of the new node key and persistently stores the wrapped DEK, the wrapped new node key and the hash of the new node key. This step is illustrated in FIG. 8F, which shows a new node key, NNK, stored in the volatile storage of the host computer H-2, and the hash of a new node key, H-NNK, a wrapped new node key, $W_{KEK}$-NNK, and a rewrapped shared key, $W_{NNK}$-DEK, stored in the nonvolatile storage of the host computer H-2. The operation then comes to an end.

The described technique allows any host computer in the cluster 102 to replicate the shared key when the KMS 104 is unavailable without requiring the requesting host computer to be authenticated. In addition, the technique does not require the master key to be transferred between the host computers in the cluster. Furthermore, the technique is immune to man-in-the middle attack. If the host computers in the cluster communicate with each other using secure connections such as SSL/TLS and man-in-the middle attack is not a concern, the technique can be simplified by removing the node key. In this simplified technique, the requesting host computer will send the wrapped shared key and get back the shared key from one of the peer host computers.

Figure 9:
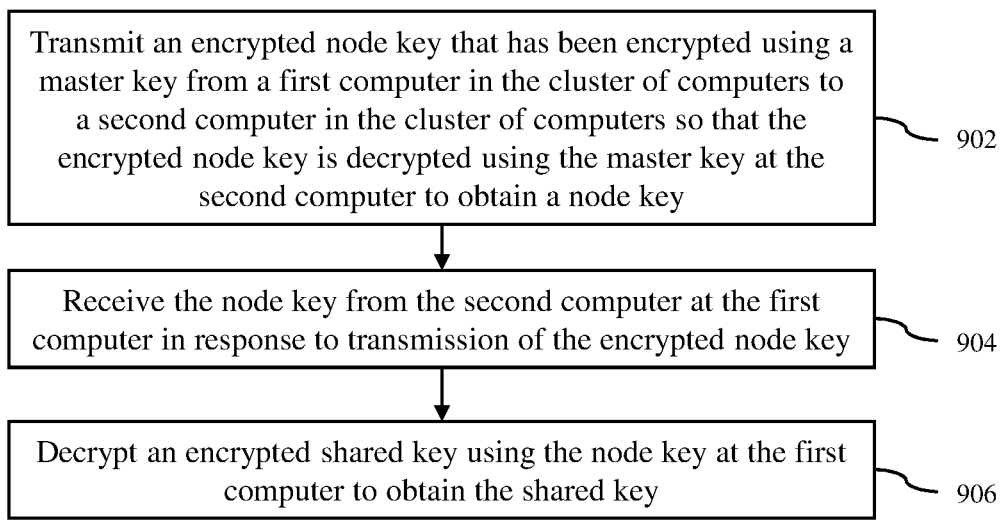
FIG. 9 is a flow diagram of a method for managing a shared key in a cluster of computers in accordance with an embodiment of the invention.

A method for managing a shared key in a cluster of computers in accordance with an embodiment of the invention is described with reference to a flow diagram of FIG. 9. At block 902, an encrypted node key is transmitted from a first computer in the cluster of computers to a second computer in the cluster of computers so that the encrypted node key is decrypted using a master key at the second computer to obtain a node key. The encrypted node key is persistently stored in a storage accessible by the first computer. Next, at block 902, the node key is received from the second computer at the first computer in response to transmission of the encrypted node key. Next, at block 904, an encrypted shared key is decrypted using the node key at the first computer to obtain the shared key. The encrypted shared key is persistently stored in the storage accessible by the first computer.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, non-volatile memory, NVMe device, persistent memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for managing a shared key in a cluster of computers, the method comprising:
   transmitting an encrypted node key that has been encrypted using a master key from a first computer in the cluster of computers to a second computer in the cluster of computers so that the encrypted node key is decrypted using the master key at the second computer to obtain a node key of the first computer, wherein the encrypted node key is persistently stored in a storage accessible by the first computer;
   receiving the node key from the second computer at the first computer in response to transmission of the encrypted node key; and
   decrypting an encrypted shared key using the node key at the first computer to obtain the shared key, wherein the encrypted shared key is persistently stored in the storage accessible by the first computer.

2. The method of claim 1, further comprising, before transmitting the encrypted node key to the second computer, determining that a key management service is not available for the first computer to obtain the master key from the key management service.

3. The method of claim 1, further comprising transmitting an identification of the master key with the encrypted node key from the first computer to the second computer so that the correct master key is used to decrypt the encrypted node key at the second computer.

4. The method of claim 1, further comprising, before decrypting the encrypted shared key at the first computer, calculating a hash of the node key received from the second computer at the first computer and checking the calculated hash of the node key with a stored hash of the node key, wherein the stored hash of the node key is persistently stored in a storage accessible by the first computer.

5. The method of claim 1, further comprising, before transmitting the encrypted node key to the second computer, rebooting the first host computer that removes the shared key from volatile memory of the first host computer.

6. The method of claim 1, further comprising:
   Receiving an identification of the master key and a master-key encrypted shared key from a cluster management server at the first computer;
   obtaining the master key from a key management service using the identification of the master key;
   decrypting the master-key encrypted shared key using the master key at the first computer to obtain the shared key;
   generating the node key at the first computer;
   encrypting the node key using the master key at the first computer;
   calculating a hash of the node key at the first computer;
   encrypting the shared key using the node key to produce the encrypted shared key; and
   persistently storing the encrypted node key, the encrypted shared key and the hash of the node key in the storage.

7. The method of claim 1, further comprising:
   obtaining the master key from a key management service using an identification of the master key;
   generating a new node key at the first computer;
   encrypting the new node key using the master key at the first computer to produce an encrypted new node key;
   calculating a hash of the new node key at the first computer;
   encrypting the shared key using the new node key to produce a new encrypted shared key; and
   persistently storing the encrypted new node key, the new encrypted shared key and the hash of the new node key in the storage.

8. A non-transitory computer-readable storage medium containing program instructions for managing a shared key in a cluster of computers, wherein execution of the program instructions by one or more processors of a computer system causes the one or more processors to perform steps comprising:
   transmitting an encrypted node key that has been encrypted using a master key from a first computer in the cluster of computers to a second computer in the cluster of computers so that the encrypted node key is decrypted using the master key at the second computer to obtain a node key of the first computer, wherein the encrypted node key is persistently stored in a storage accessible by the first computer;
   receiving the node key from the second computer at the first computer in response to transmission of the encrypted node key; and
   decrypting an encrypted shared key using the node key at the first computer to obtain the shared key, wherein the encrypted shared key is persistently stored in the storage accessible by the first computer.

9. The non-transitory computer-readable storage medium of claim 8, wherein the steps further comprise, before transmitting the encrypted node key to the second computer, determining that a key management service is not available for the first computer to obtain the master key from the key management service.

10. The non-transitory computer-readable storage medium of claim 8, wherein the steps further comprise transmitting an identification of the master key with the encrypted node key from the first computer to the second computer so that the correct master key is used to decrypt the encrypted node key at the second computer.

11. The non-transitory computer-readable storage medium of claim 8, wherein the steps further comprise, before decrypting the encrypted shared key at the first computer, calculating a hash of the node key received from the second computer at the first computer and checking the calculated hash of the node key with a stored hash of the node key, wherein the stored hash of the node key is persistently stored in a storage accessible by the first computer.

12. The non-transitory computer-readable storage medium of claim 8, wherein the steps further comprise, before transmitting the encrypted node key to the second computer, rebooting the first computer that removes the shared key from volatile memory of the first host computer.

13. The non-transitory computer-readable storage medium of claim 8, wherein the steps further comprise:
- receiving an identification of the master key and a master-key encrypted shared key from a cluster management server at the first computer;
- obtaining the master key from a key management service using the identification of the master key;
- decrypting the master-key encrypted shared key using the master key at the first computer to obtain the shared key;
- generating the node key at the first computer;
- encrypting the node key using the master key at the first computer;
- calculating a hash of the node key at the first computer;
- encrypting the shared key using the node key to produce the encrypted shared key; and
- persistently storing the encrypted node key, the encrypted shared key and the hash of the node key in the storage.

14. The non-transitory computer-readable storage medium of claim 8, wherein the steps further comprise:
- obtaining the master key from a key management service using an identification of the master key;
- generating a new node key at the first computer;
- encrypting the new node key using the master key at the first computer to produce an encrypted new node key;
- calculating a hash of the new node key at the first computer;
- encrypting the shared key using the new node key to produce a new encrypted shared key; and
- persistently storing the encrypted new node key, the new encrypted shared key and the hash of the new node key in the storage.

15. A computer in a cluster of computers comprising:
memory; and
a processor configured to:
- transmit an encrypted node key that has been encrypted using a master key to a second computer in the cluster of computers so that the encrypted node key is decrypted using the master key at the second computer to obtain a node key of the computer, wherein the encrypted node key is persistently stored in a storage accessible by the computer;
- receive the node key from the second computer in response to transmission of the encrypted node key; and
- decrypt an encrypted shared key using the node key at the computer to obtain the shared key, wherein the encrypted shared key is persistently stored in the storage accessible by the computer.

16. The computer of claim 15, wherein the processor is further configured to, before transmitting the encrypted node key to the second computer, determine that a key management service is not available for the first computer to obtain the master key from the key management service.

17. The computer of claim 15, wherein the processor is further configured to transmit an identification of the master key with the encrypted node key from the first computer to the second computer so that the correct master key is used to decrypt the encrypted node key at the second computer.

18. The computer of claim 15, wherein the processor is further configured to, before decrypting the encrypted shared key at the first computer, calculate a hash of the node key received from the second computer at the first computer and checking the calculated hash of the node key with a stored hash of the node key, wherein the stored hash of the node key is persistently stored in a storage accessible by the first computer.

19. The computer of claim 15, wherein the processor is further configured to, before transmitting the encrypted node key to the second computer, reboot the first host computer that removes the shared key from volatile memory of the first host computer.

20. The computer of claim 15, wherein the processor is further configured to:
- receive an identification of the master key and a master-key encrypted shared key from a cluster management server;
- obtain the master key from a key management service using the identification of the master key;
- decrypt the master-key encrypted shared key using the master key to obtain the shared key;
- generate the node key;
- encrypt the node key using the master key;
- calculate a hash of the node key;
- encrypt the shared key using the node key to produce the encrypted shared key; and
- persistently store the encrypted node key, the encrypted shared key and the hash of the node key in the storage.

* * * * *